June 13, 1939.    C. B. GOODSTEIN    2,161,810
METHOD OF STAPLING AND DEVICE THEREFOR
Original Filed July 23, 1935    2 Sheets-Sheet 1
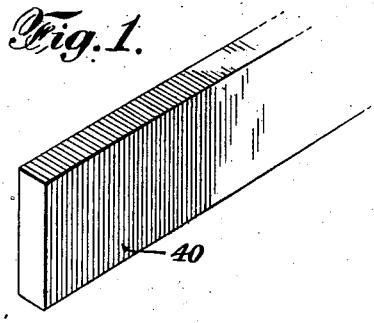
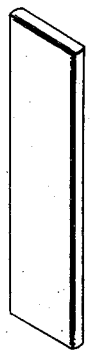
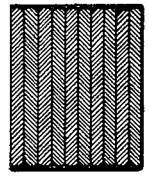
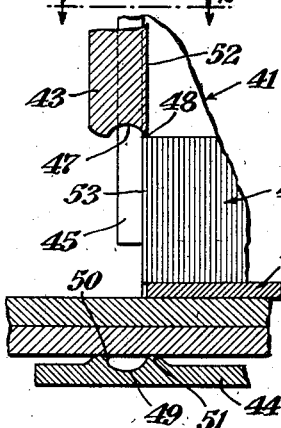
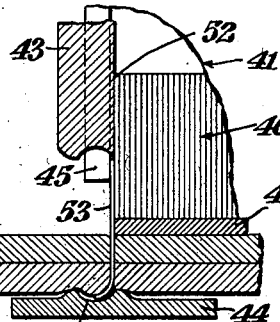
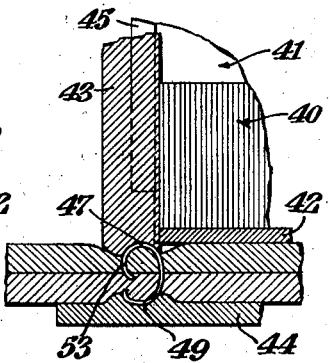
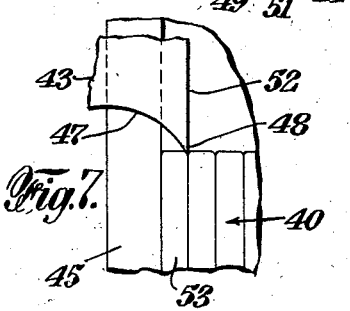
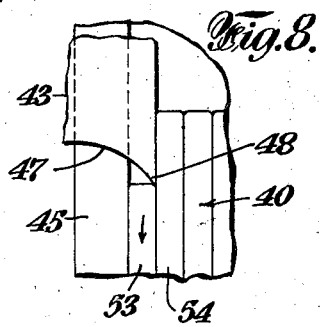
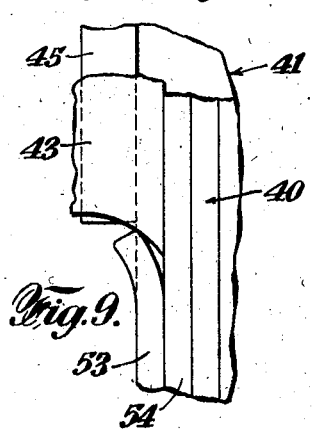
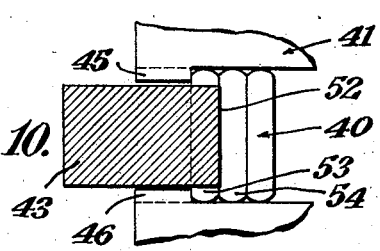
INVENTOR
Charles B. Goodstein
BY
ATTORNEY

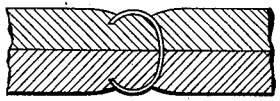
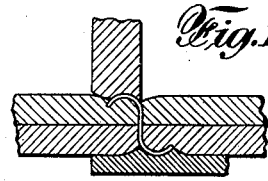
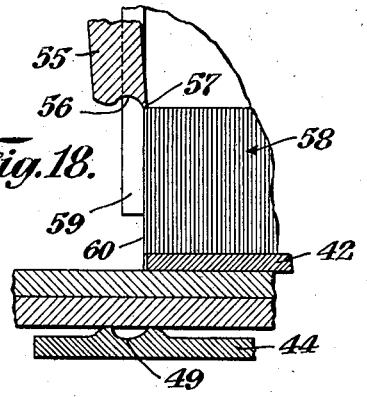
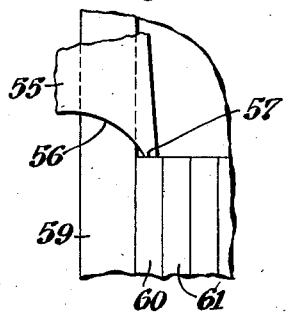
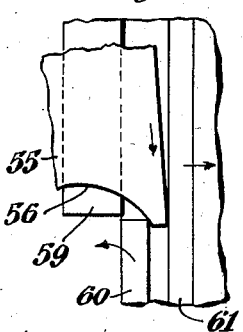
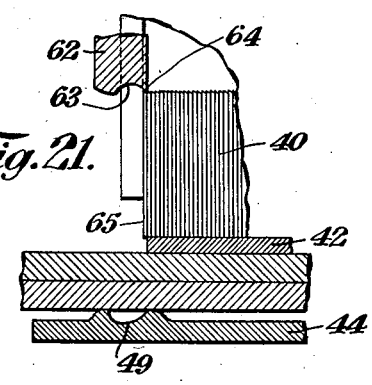
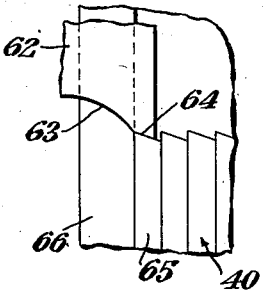
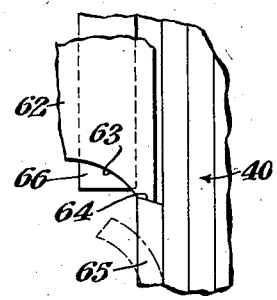
INVENTOR
Charles B. Goodstein
BY
ATTORNEY Patented June 13, 1939

2,161,810

UNITED STATES PATENT OFFICE 2,161,810

METHOD OF STAPLING AND DEVICE THEREFOR

Charles B. Goodstein, Brooklyn, N. Y.

Application July 23, 1935, Serial No. 32,743
Renewed December 31, 1937

13 Claims. (Cl. 1—1)

This invention relates to a stapling method and apparatus employed therein for operative use with corrugated board, fibre, cardboard, wood, and other materials.

Stapling or stitching machines are generally adapted either to drive preformed staples suitably fed in quantity lots into the machine, or to cut, form and drive stitches from a continuous length of wire. In the former method it has been found that relatively small quantities of stitches can be stored in the machine magazine or feeding chamber, due to the width, thickness and shape of the staple, thereby requiring frequent reloadings. In the latter method the machines employed are essentially of intricate and heavy construction because of the number and nature of the operations to be performed and the power required therefor, rendering them bulky, cumbersome and costly. To overcome these disadvantages I have conceived this invention whereby a relatively simple and light device can efficiently perform the required stapling operations with the use of but a single moving part, namely the driving and forming plunger, employing inexpensive staples of such form and design as to be exceedingly economical of space and adaptable for easy and ready fabrication and capable of effecting a firm and secure clench, the accomplishment of all of which constitutes some of the objects of my invention.

Other objects of this invention are to eliminate the buckling of the staples during the driving operation, to reduce the material employed in the staple proper, and to enable a number of staples to be simultaneously driven.

Other objects, features and advantages will appear from the drawings and the description hereinafter given.

Referring to the drawings,

Figure 1 represents a stack of one form of staple strips employed in this invention.

Figure 2 is an enlarged perspective of one of the staple strips of Figure 1.

Figure 3 is a sectional plan of a portion of the stack of Figure 1, showing the staples adhesively held together.

Figure 4 is a fragmentary side section of one form of device constituting my invention, showing the plunger just prior to beginning its downward stroke.

Figure 5 shows the plunger of Figure 4 and the staple driven thereby midway during the operative stroke.

Figure 6 illustrates the final clench of the staple after the completion of the stroke of the plunger of Figure 4.

Figures 7, 8 and 9 are enlarged fragmentary side views illustrating three positions of the plunger and downwardly driven staple during the operation of the device of Figure 4.

Figure 10 is a fragmentary plan view of Figure 4 taken along line 10—10.

Figures 11, 12 and 13 illustrate three different forms of driven staples, for various thicknesses of material being stapled and different lengths of staple.

Figure 14 illustrates the final clenching position of an S form of stitch produced by my invention.

Figures 15, 16 and 17 are front views of three different forms of staple strips adaptable for use in the apparatus and method constituting this invention.

Figure 18 is a fragmentary side sectional view showing a modification of the invention with an angularly directed plunger.

Figures 19 and 20 are enlarged fragmentary side views illustrating the operation of the device of Figure 18.

Figure 21 is a fragmentary side sectional view of still another modification of my invention showing the form of device employed in conjunction with a stack of staples with angularly cut tops.

Figures 22 and 23 are enlarged fragmentary side views showing the operation of the device of Figure 21.

Figures 24 and 25 are side views of two forms of staple that may be employed in the device of Figure 21.

In the drawings, and particularly with reference to the form of my invention illustrated in Figures 4 to 10, the stack of staple strips 40 is operatively inserted into the staple machine 41 which contains the staple support base 42, the reciprocating plunger 43, the stationary anvil 44 and the staple retaining walls or guide members 45 and 46 the bottoms of which are positioned a predetermined distance above the level of the base of the machine. The plunger 43, as will be observed, is narrower than the staple strips,—the driving surface of the plunger containing an upwardly curved concave wall 47 constituting a forming die, and a driving or staple engaging edge 48. The anvil 44 contains the downwardly curved concave wall 49 constituting another forming die in cooperative relationship with the wall 47,—the curvature of the said wall 49 being suitably formed to produce a return bend of the bottom portion of the staple as indicated in Figure 6,—the uppermost portions 50 and 51 of the anvil being adapted for engagement with the bottom surface of the material being stapled.

In the form of device disclosed in Figures 7, 8 and 9, the staple-engaging portion 48 is a relatively sharp edge formed by the juncture of the concave wall 47 and the rear surface 52 of the plunger,—said portion 58 being operatively applied to the rear edge of the foremost staple 53. As the plunger is directed downwardly, the said surface 52 is brought into slidable engagement with the front surface of the second staple 54 in the stack,—so that the staple stack proper serves as one of the elements constituting the apparatus. The inwardly extending guide members 45 and 46, being in engagement with the lateral sides of the driven strip, keep the upper portion of said strip confined to its straight longitudinal path until the top of the stitch 53 clears said guide members. Meanwhile, during the said driving operation, the lower portion of the strip is being forced through the material to be stapled until it comes into engagement with the wall 49 of the anvil 44. The continued driving movement causes said bottom portion of the strip to be slidably moved along the wall 49,—thereby being deflected against the material to form a bottom clench such as is shown in Figure 6. At this point the staple has practically completed its downward movement, and inasmuch as the top of the strip has cleared the guide members 45 and 46 as above stated, a further downward movement of the plunger will cause a forward bending of the strip as shown in Figure 9, the upper portion being deflected downwardly against and into the material as illustrated in Figure 6. The forward force actuating the top of the strip is due to the position of the edge 48 between staple strips 53 and 54, and to the curvature of the surface 47,—the form of the curved wall 47 being such as to cause a return bend and penetration of the staple into the material. For best operative results it is advisable that the stroke of the plunger 43 extend below the base 42.

By the use of the above method, or certain other methods hereinafter to be described, the results illustrated in Figures 11, 12 and 13 can be obtained, the differences in the final clench being due to difference in the thickness of material being stapled, and in the length of the staple strips. Instead of having the anvil positioned directly underneath the plunger, it can be slightly to the rear thereof, to form an S stitch as shown in Figure 14,—the principle of operation to accomplish this result being similar to that hereinabove described. It should also be observed that instead of using the flat top staple strip shown in Figure 2, the strips can contain pointed tops and bottoms, or those containing V-shaped depressions therein, or combinations of both as shown in Figures 15, 16 and 17. Such pointed strips permit an easier penetration into the material being stapled, thereby facilitating the operation of the apparatus.

Another modification of the device for use in conjunction with this method is illustrated in Figures 18, 19 and 20. In this form the plunger 55 is angularly disposed, and contains the concave forming wall 56 and the relatively flat driving or staple-engaging portion 57. The stack of staples 58 is urged forwardly by yieldable means and is prevented from being projected through the machine by the guide members 59 (only one of which is shown in the drawings) equivalent to the guide members 45 and 46 of Figure 10. It will be noted that there is only a slight inclination of the plunger, so that during its downward stroke it will not only move the foremost staple 60 downwardly, but will also engage the second staple 61 to force the stack of staple strips rearwardly against the action of the yieldable feeding means. When the said driven staple clears said guide members 59, it will be deflected forwardly and against the material in the manner hereinabove described in connection with the first form of my invention. The bottom clenching operation is also similar to that above described.

Still another modification is disclosed in Figures 21, 22 and 23 which show a form of the device used in conjunction with staples the tops of which are angulated downwardly in a rearwardly direction. The plunger 62 has the concave forming wall 63 at the bottom thereof, and the inclined driving surface 64 adapted to operatively engage the top of the foremost staple strip 65. When the top of the driven staple clears the guide members 66 (similar to those hereinabove described), the driving surface 64 will force the top of the strip 65 forwardly, inasmuch as there are two component forces, one in a downwardly and the other in a forwardly direction. Upon the continued drive of the plunger, a top and a bottom clench will be formed in the manner above described. The staple strips illustrated in Figures 24 and 25 are particularly adapted for use with this form of my invention, the pointed bottoms serving to facilitate penetration. It will be noted that these strips can be readily cut from a continuous wire without wastage,—inasmuch as adjacent strips will have the same forms.

Although the devices hereinabove shown are illustrated in operative use with a stack of staple strips, it is within the contemplation of my invention to employ them in conjunction with a continuous length of wire fed into the machine and cut into strips instead of being stacked. Regardless of whether the staple strips are cut in the machine from such a continuous length of wire or are fed therein through a hopper or in stack form, it is apparent that these strips are of relatively simple design and capable of easy and ready fabrication. Furthermore, particularly where used in stack form, they are economical of space, so that a relatively large number of staple strips can be fed into a machine for operative purposes, thereby reducing the frequency of reloadings.

Inasmuch as there is but a single moving part, namely the driving and forming plunger,—the anvil being stationary,—the entire apparatus is an exceedingly simple and inexpensive structure. It will be further noted that the inherent simplicity and compactness of design is such as to enable multiple head units to be employed, thereby permitting a number of staples to be simultaneously driven.

It is of course understood that other additional forms and modifications of the apparatus and adaptations of the method constituting this invention can be employed beyond and in addition to those hereinbefore described, all within the scope of the appended claims.

What I claim is:

1. In a stapling device for driving and clenching a vertically disposed straight staple strip, two vertical guide members engageable with the lateral sides of the strip and terminating above the surface of the material being stapled, and a plunger narrower than the width of the strip and vertically movable between said guide members for driving the staple strip downwardly a predetermined distance in the direction of its length into the material, the underside of the plunger being adapted to operatively engage the top portion of the strip to deflect it downwardly into engagement with the material to form a top clench.

2. In a staple device for driving and clenching a vertically disposed straight staple strip, two vertical guide members engageable with the lateral sides of the strip and terminating above the surface of the material being stapled, and a plunger narrower than the width of the strip and vertically movable between said guide members and engageable with the upper edge of the strip for driving it downwardly in the direction of its length into and through the material, and a stationary anvil cooperatively positioned with respect to said plunger and adapted to underlie the material and receive for operative engagement the penetrating portion of the driven strip, the plunger and anvil containing forming dies adapted for operative engagement with the upper and lower portions of the strip respectively to deflect them towards and into engagement with the material to form top and bottom clenches respectively.

3. In a stapling device for driving and clenching a straight staple strip, means for supporting the strip vertically in the direction of its length, a plunger adapted to engage the upper edge of the strip for driving it downwardly towards and into the material being stapled, a stationary anvil cooperatively positioned with respect to said plunger and adapted to underlie the material, an upwardly curved concave forming die at the bottom of the plunger and a downwardly curved concave forming die on the anvil, said dies being adapted to operatively engage the upper and lower portions of the strip respectively, and guiding means adapted for engagement with a portion of the strip for holding it against deviation from its straight downward path, said guiding means being positioned at a predetermined height above the base of the device.

4. In a stapling device for operatively driving a straight staple strip from a stack thereof, means for supporting the stack with the staple strips vertically disposed, a plunger containing on the underside thereof a concave forming wall and a driving edge adapted to engage the top of the foremost strip for severing it from the stack and driving it downwardly in the direction of its length towards and into the material being stapled, and a stationary anvil cooperatively positioned with respect to said plunger and adapted to underlie the material and to engage the penetrating portion of the driven strip and deflect it upwardly into engagement with the material to form a bottom clench, guiding means adapted for engagement with a portion of the strip for holding it against deviation from its straight downward path, said guiding means being positioned at a predetermined height above the base of the device, said concave forming wall being adapted to engage the upper portion of the driven staple strip after it has passed below said guiding means to cause a forward and downward deflection thereof into engagement with the material to form a top clench.

5. In a method of stapling, the steps of feeding a stack of vertically disposed straight staple strips towards the driving position, applying pressure to the top of the foremost strip to simultaneously detach it from the stack and force it downwardly in the direction of its length towards the material being stapled supporting a predetermined length of the upper portion of the strip being driven to confine it to a straight longitudinal path during a predetermined part of its downward motion, forcing it into and through the material, deflecting the protruding penetrating portion of the strip upwardly into engagement with the material to form a bottom clench, and deflecting the upper portion of the strip downwardly into engagement with the material to form a top clench.

6. In a stapling device, means for supporting a stack of vertically disposed straight staple strips, a plunger containing on the underside thereof a concave forming wall and a driving edge formed by the juncture of said wall and the rear surface of the plunger, said driving edge being adapted to engage the upper rear edge of the foremost strip for driving it downwardly in the direction of its length towards and into the material being stapled, a stationary anvil cooperatively positioned with respect to said plunger and adapted to underlie the material, guiding means adapted for engagement with a portion of the strip for holding it against deviation from its straight downward path, said guiding means being positioned at a predetermined height above the base of the device, the said rear surface of the plunger being slidably engageable with the front surface of the second strip in said stack during the operative stroke of the plunger, the said driving edge being adapted to wedge itself between the upper portion of the driven staple strip and the second strip after said driven strip has passed below said guiding means to cause a forward deflection of said upper portion of the driven strip, and the said concave forming wall being adapted upon a continued operative movement of the plunger to further deflect said upper portion and bring it into engagement with the material to form a top clench, the anvil being adapted to operatively engage the penetrating portion of the driven strip and deflect it upwardly against the material.

7. In a method of stapling from a stack of vertically disposed straight staple strips, the steps of yieldably forcing said stack toward the driving position, applying pressure to the top of the foremost strip to simultaneously detach it from the stack and force it downwardly in the direction of its length towards the material being stapled, forcing it into and through the material, deflecting the protruding penetrating portion of the strip upwardly into engagement with the material to form a bottom clench, confining a predetermined length of the upper portion of the strip to its straight longitudinal path from its initial movement until the completion of said bottom clenching step, applying pressure, after the completion of said bottom clenching operation, to the stack of staples to move it rearwardly out of engagement with the strip being driven, and deflecting said predetermined length of the upper portion downwardly into engagement with the material to form a top clench.

8. In a stapling device for operatively driving a straight staple strip from a stack thereof, means for supporting the stack with the staple strips vertically disposed, a plunger containing on the underside thereof a rearwardly disposed driving surface and a forwardly disposed concave forming surface, yieldable means urging said stack forwardly, said driving surface of the plunger being adapted for engagement with the top edge of the foremost strip in the stack to sever it therefrom and drive it downwardly a predetermined distance towards and into the material being stapled, said plunger being slightly inclined rearwardly so as to engage the second staple in the stack at a predetermined point to force the stack rearwardly against the action of said yieldable means and simultaneously move said driving surface out of engagement with the top edge of the driven staple and said concave forming surface into operative engagement therewith.

9. A method of driving a straight staple strip having a top edge sloping downwardly in a rearwardly direction, comprising the steps of driving the strip in the direction of its length towards the material being stapled, forcing it into and through the material, deflecting the protruding penetrating portion of the strip upwardly into engagement with the material to form a bottom clench, confining a predetermined length of the upper portion of the strip to its straight longitudinal path from its initial movement until the completion of said bottom clenching step, applying forward and downward pressure to said top edge of the strip, after the completion of said bottom clenching operation, to deflect the strip forwardly and downwardly, and forcing the deflected portion downwardly into engagement with the material to form a top clench.

10. In a stapling device for operatively driving the foremost of a stack of vertically disposed straight staple strips containing downwardly and rearwardly inclined top edges, a plunger containing at the bottom rear thereof a driving surface with substantially the same inclination as said top edges, the bottom front of the plunger containing a concave forming surface, said driving surface of the plunger being adapted for engagement with the top edge of the foremost strip in the stack to sever it therefrom and drive it a predetermined disance downwardly towards and into the material being stapled, retaining means positioned above the base of the machine for confining the strip to its straight downward path while in engagement therewith, the inclination of the said driving surface being such as to cause a forward deflection of the upper portion of the driven staple when it passes below said retaining means and an operative engagement thereof with said concave forming surface during the continued downward movement of the plunger.

11. In a stapling device for driving and clenching a vertically disposed straight staple strip having an upper end to be engaged by a driving plunger, strip confining fixed means engageable with at least one side of the upper end portion of said strip below said upper end and terminating at its lower end in spaced relation above the surface of the material being stapled to confine said strip to a longitudinal path during penetration of the material, a plunger vertically movable toward said material for driving the staple strip downwardly a predetermined distance in the direction of its length into the material, and deflecting means adapted to operatively engage the upper portion of the strip below said confining means when the strip is unconfined by said confining means to deflect it downwardly into engagement with the material to form a top clench.

12. In the method of operatively driving a straight staple strip, the steps of applying pressure to the top of the strip to force it downwardly in the direction of its length towards and into the material being stapled, confining the strip at its front and rear surfaces below its top during penetration of the material, then deflecting the upper portion of the strip from the longitudinal path during the continued downward movement of the strip, and continuing said pressure until said deflected portion comes into engagement with the material to form a top clench.

13. In the method of operatively driving a straight staple strip, the steps of applying pressure to the top of the strip to force it downwardly in the direction of its length into and through the material being stapled, deflecting the protruding penetrating strip upwardly into engagement with the material to form a bottom clench, confining the strip at its front and rear surfaces below its top during penetration of the material and formation of said bottom clench, then deflecting the upper portion of the strip from the longitudinal path, and continuing said pressure until said deflected portion comes into engagement with the material to form a top clench.

CHARLES B. GOODSTEIN.